(12) United States Patent
Kast

(10) Patent No.: US 12,492,657 B2
(45) Date of Patent: Dec. 9, 2025

(54) EXHAUST GAS SYSTEM FOR AN INTERNAL COMBUSTION ENGINE

(71) Applicant: Purem GmbH, Neunkirchen (DE)

(72) Inventor: Peter Kast, Esslingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 18/750,701

(22) Filed: Jun. 21, 2024

(65) Prior Publication Data
US 2024/0426233 A1    Dec. 26, 2024

(30) Foreign Application Priority Data
Jun. 23, 2023 (DE) .................. 10 2023 116 524.0

(51) Int. Cl.
| | |
|---|---|
| F01N 3/20 | (2006.01) |
| B01F 25/21 | (2022.01) |
| B01F 25/314 | (2022.01) |
| B01F 25/40 | (2022.01) |
| B01F 25/435 | (2022.01) |
| F01N 3/28 | (2006.01) |
| F01N 13/18 | (2010.01) |

(52) U.S. Cl.
CPC ....... *F01N 3/2066* (2013.01); *F01N 13/1805* (2013.01); *B01F 25/211* (2022.01); *B01F 25/314231* (2022.01); *B01F 25/40* (2022.01); *B01F 25/435* (2022.01); *F01N 3/206* (2013.01); *F01N 3/208* (2013.01); *F01N 3/2892* (2013.01); *F01N 2240/20* (2013.01); *F01N 2330/36* (2013.01); *F01N 2330/38* (2013.01); *F01N 2470/14* (2013.01); *F01N 2470/16* (2013.01); *F01N 2610/1453* (2013.01)

(58) Field of Classification Search
CPC combination set(s) only.
See application file for complete search history.

(56) References Cited

U.S. PATENT DOCUMENTS

| | | | |
|---|---|---|---|
| 11,149,611 B2 * | 10/2021 | Oohara | F01N 3/24 |
| 2011/0107749 A1 * | 5/2011 | Tsujimoto | F01N 13/08 |
| | | | 60/297 |
| 2013/0239546 A1 | 9/2013 | Levin et al. | |
| 2014/0196442 A1 | 7/2014 | Katou et al. | |
| 2015/0040537 A1 * | 2/2015 | Hicks | B01F 23/2132 |
| | | | 60/273 |
| 2022/0268192 A1 * | 8/2022 | Whitten | B01F 25/3131 |
| 2022/0298949 A1 * | 9/2022 | Chiruta | B01F 25/432 |
| 2022/0356832 A1 * | 11/2022 | Brenner | F01N 3/2892 |

(Continued)

FOREIGN PATENT DOCUMENTS

| | | |
|---|---|---|
| CN | 113756923 A | 12/2021 |
| WO | 2018/231135 A1 | 12/2018 |

*Primary Examiner* — Binh Q Tran
(74) *Attorney, Agent, or Firm* — Walter Ottesen, P.A.

(57) ABSTRACT

An exhaust gas system for an internal combustion engine includes an exhaust gas treatment unit, an exhaust gas guide conducting exhaust gas to the exhaust gas treatment unit and a reactant discharge unit for the discharge of reactant into the exhaust gas guide. The exhaust gas guide includes an outer pipe and an inner pipe in a longitudinal region between the reactant discharge unit and the exhaust gas treatment unit. An external volume through which exhaust gas can flow and an internal volume through which exhaust gas can flow in the inner pipe are provided.

12 Claims, 2 Drawing Sheets

(56) References Cited

U.S. PATENT DOCUMENTS

2023/0143888 A1\* 5/2023 Liu .................... B01F 25/4316
422/168
2023/0250746 A1\* 8/2023 Weinmann .......... B01F 23/2132
60/324

\* cited by examiner

EXHAUST GAS SYSTEM FOR AN INTERNAL COMBUSTION ENGINE

CROSS-REFERENCE TO RELATED APPLICATIONS

This application claims priority of German patent application no. 10 2023 116 524.0, filed Jun. 23, 2023, the entire content of which is incorporated herein by reference.

TECHNICAL FIELD

The present disclosure relates to an exhaust gas system for an internal combustion engine, for example in a vehicle.

BACKGROUND

In order to reduce the emission of pollutants, in particular the emission of nitrogen oxide, from diesel internal combustion engines it is known to mix a reactant, for example a urea/hydrogen solution, with the exhaust gas emitted from such an internal combustion engine, so that water and nitrogen are formed by a catalytic reaction of the nitrogen oxide contained in the exhaust gas with ammonia in an exhaust gas treatment unit, in particular an SCR catalytic converter, through which the mixture of exhaust gas and reactant flows.

For an efficient catalytic reaction for exhaust gas cleaning it is necessary that the reactant mixed with the exhaust gas, which is generally in liquid form as spray, is thoroughly mixed with the exhaust gas upstream of the exhaust gas treatment unit and is evaporated in order to avoid the occurrence of deposits, in particular of urea, contained in the reactant and the ingress of liquid reactant into the exhaust gas treatment unit.

SUMMARY

It is an object of the present disclosure to provide an exhaust gas system for an internal combustion engine which is able to ensure an efficient mixing of exhaust gas and reactant, in particular even in a cold start phase.

According to the disclosure, this object is achieved by an exhaust gas system for an internal combustion engine, including:
- at least one exhaust gas treatment unit,
- an exhaust gas guide component conducting exhaust gas to the at least one exhaust gas treatment unit,
- a reactant discharge unit for the discharge of reactant into the exhaust gas guide component.

The exhaust gas guide component includes an outer pipe and an inner pipe in a longitudinal region between the reactant discharge unit and the exhaust gas treatment unit, wherein an external volume through which exhaust gas can flow and an internal volume through which exhaust gas can flow in the inner pipe are provided between the outer pipe and the inner pipe.

The provision of the inner pipe and the internal volume formed therein makes it possible to avoid substantially a contact of the reactant, to be mixed with the exhaust gas and to be evaporated, with the outer pipe which is relatively cold, in particular in a cold start phase, and which only heats up slowly. The reactant can be efficiently evaporated on an inner surface of the inner pipe, around which exhaust gas flows on its outer surface and thus also heats up relatively rapidly at the start of the operation of an internal combustion engine, and this, on the one hand, avoids the production of deposits and, on the other hand, promotes the mixing with the exhaust gas carrying the reactant.

In order to eliminate substantially entirely a contact of the reactant with the outer pipe in the longitudinal region in which the inner pipe extends, it is proposed that the reactant discharge unit is arranged such that reactant discharged by the reactant discharge unit into the exhaust gas guide component is discharged substantially only into the internal volume.

For an embodiment of the exhaust gas guide component which is simple to implement in the longitudinal region having the outer pipe and the inner pipe, and thus is configured to be double-walled, the outer pipe can extend substantially in a linear manner in the longitudinal region, in the direction of an outer pipe longitudinal axis extending in a linear manner.

It is possible to achieve a construction which is simple to implement and with uniform flowthrough of the exhaust gas system when the outer pipe is configured to be substantially cylindrical in the longitudinal region.

The mixing of exhaust gas and reactant can be assisted by the inner pipe extending so as to be wound in a substantially helical manner in the direction of an inner pipe longitudinal axis extending in a linear manner.

If it is provided that the inner pipe longitudinal axis extends in the internal volume in the entire longitudinal region, it is ensured at the same time that the inner pipe has a sufficiently large flow cross section so that a correspondingly large component of the exhaust gas flowing through the exhaust gas guide component can flow through the internal volume and can be mixed at the same time with the evaporating reactant.

If the inner pipe bears against the outer pipe along a connecting line wound in a helical manner around the inner pipe longitudinal axis, the component of the exhaust gas which flows through the external volume and which flows through the exhaust gas guide component is forced into a helical flow path, whereby at the downstream end of the longitudinal region where the exhaust gas flows, which flow through the external volume and the internal volume, are combined, the mixing of these exhaust gas flows and thus also the mixing of the component of the exhaust gas flowing through the external volume are assisted by the already evaporated reactant.

In the region of the connecting line, for example, the inner pipe can be connected to the outer pipe by a material connection, such as for example welding.

In order to avoid the occurrence of cross-sectional constrictions, in particular in the external volume, it is proposed that the outer pipe and the inner pipe have a substantially uniform cross-sectional geometry in the longitudinal region.

For example, the outer pipe and the inner pipe can have a substantially circular cross-sectional geometry in the longitudinal region.

Ratios which are uniform and which avoid the occurrence of excessive flow resistance can be further assisted by the inner pipe, and thus the internal volume configured therein, having a substantially uniform cross-sectional geometry and/or a substantially uniform cross-sectional size in the longitudinal region.

In order to be able to combine the two exhaust gas flows flowing through the external volume and the internal volume upstream of the exhaust gas treatment unit, and thus to supply the exhaust gas treatment unit with an exhaust gas flow which is mixed substantially uniformly with reactant, it is proposed that the inner pipe terminates upstream of a downstream end of the outer pipe or/and upstream of the exhaust gas treatment unit.

The at least one exhaust gas treatment unit can include, for example, an SCR catalytic converter.

BRIEF DESCRIPTION OF DRAWINGS

The invention will now be described with reference to the drawings wherein.

DETAILED DESCRIPTION

Figure 1:
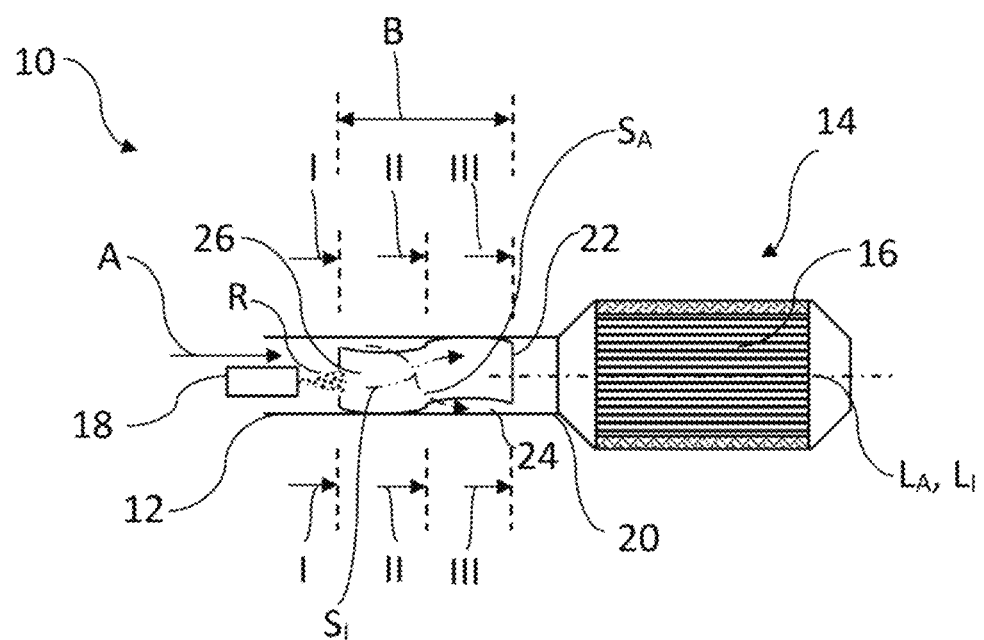
FIG. 1 shows schematically a longitudinal sectional view of an exhaust gas system; and, FIGS. 2A to 2C show cross-sectional views of an exhaust gas guide component of the exhaust gas system of FIG. 1 on an upstream end region of an inner pipe of the exhaust gas guide component (section I-I), on a central longitudinal region of the inner pipe (section II-II) and on a downstream end region of the inner pipe (section III-III).

FIG. 1 shows an exhaust gas system 10 for an internal combustion engine with an exhaust gas guide component 12 receiving the exhaust gas A emitted from an internal combustion engine and an exhaust gas treatment unit 14 connected thereto downstream thereof. The exhaust gas treatment unit 14 can include, for example, an SCR catalytic converter 16 wherein the exhaust gas A together with reactant R, for example a urea/water solution, discharged into the exhaust gas guide component 12 by a reactant discharge unit 18, denoted generally as the injector, is converted in a catalytic reaction in order to reduce thereby the nitrogen oxide component in the exhaust gas A.

The exhaust gas guide component 12 includes an outer pipe 20 which is elongated in the direction of an outer pipe longitudinal axis $L_A$ extending in a linear manner and, in particular, in the portion adjoining the exhaust gas treatment unit 14 is configured to be substantially cylindrical with a circular cross-sectional geometry, for example. An inner pipe 22 is arranged in the interior of the outer pipe 20. The inner pipe 22 is elongated in the direction of an inner pipe longitudinal axis $L_I$ corresponding to the outer pipe longitudinal axis $L_A$, for example, and has a structure which is wound in principle in a helical manner, that is, substantially corresponding to the geometry of a corkscrew. Since in principle the inner pipe 22 has a smaller cross-sectional dimension than the outer pipe 20, an external volume 24 is formed between the outer pipe 20 and the inner pipe 22, the external volume in principle also having a structure which is wound in an annular and helical manner due to the helically wound structure of the inner pipe 22.

Figure 2A:
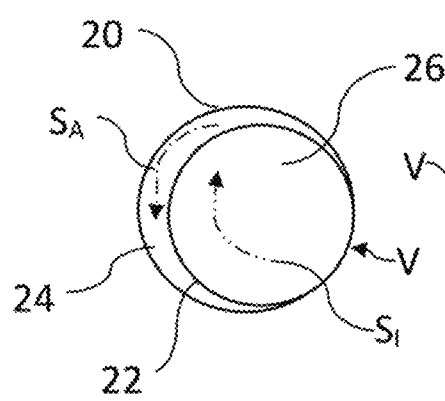
Figure 2B:
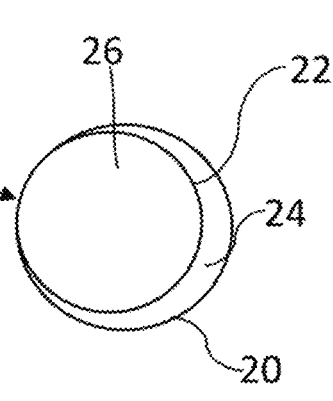
Figure 2C:
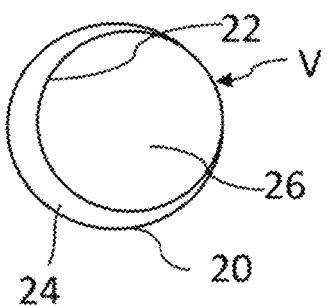

If, as FIGS. 2A to 2C illustrate, the inner pipe 22 in the entire longitudinal region B covered thereby, in which also the external volume 24 is formed, has a substantially constant cross-sectional geometry and cross-sectional size, for example also a circular cross-sectional geometry, the external volume 24 also has substantially the same cross-sectional surface in the entire longitudinal region B. In this manner, flow constrictions can be avoided in the external volume 24. At the same time, in such an embodiment of the inner pipe 22, an internal volume 26 which is formed therein has a uniform cross-sectional geometry and cross-sectional surface in the entire longitudinal region B in which the inner pipe 22 extends along the inner pipe longitudinal axis $L_I$, so that uniform flow conditions can also be ensured in the inner pipe 22 or the internal volume 26 formed therein.

The helically wound structure of the inner pipe 22 and the dimensioning of the inner pipe 22 or the winding thereof around the inner pipe longitudinal axis $L_I$ results in a connecting line V helically surrounding the inner pipe longitudinal axis $L_I$ or the outer pipe longitudinal axis $L_A$, in principle extending in the direction of these longitudinal axes, the inner pipe 22 and the outer pipe 20 being in mutual contact in the region of this connecting line. The inner pipe 22 and the outer pipe 20 can be fixedly connected together, for example by welding, for example laser welding, spot welding, or the like, in the region of this connecting line V which is preferably configured continuously in the direction of the two longitudinal axes and thus contributes to the external flow $S_A$ leaving the external volume 24 as a swirled flow.

The exhaust gas A, which is emitted from the internal combustion engine and flows in the exhaust gas guide component 12 toward the longitudinal region B, is divided at the upstream end region of the inner pipe 22 or the longitudinal region B into a part flowing through the external volume 24 and a part flowing through the internal volume 26. Due to the helically wound structure of the inner pipe 22 and thus also the external volume 24, the part of the exhaust gas A flowing through the external volume 24 is accelerated in the circumferential direction, so that in principle an external flow $S_A$ is generated with swirl by this part of the exhaust gas A. Accordingly, due to the helically wound structure of the inner pipe 22 and thus also the internal volume 26, the part of the exhaust gas A flowing through the internal volume 26 is transferred into an internal flow S with swirl.

The reactant discharge unit 18 is preferably positioned such that the reactant R discharged thereby at the upstream end of the inner pipe 22 is substantially only discharged into the internal volume 26. For example, the reactant discharge unit 18 can be positioned such that by taking into account the opening angle of the spray cone discharged thereby, relative to the upstream inflow opening of the inner pipe 22, it is ensured that substantially no reactant R flows into the external volume 24. The reactant discharge unit 18 could also be positioned such that its discharge end extends into the internal volume 26.

The reactant R, which is introduced into the part of the exhaust gas A flowing in the internal volume 26, is carried by the internal flow $S_I$ and is also accelerated radially outwardly by the swirl generated thereby, so that it comes increasingly into contact with the inner surface of the inner pipe 22 and can evaporate thereon. Since the outer flow $S_A$ flows around the inner pipe 22 on its external surface, that is, due to relatively warm exhaust gas, at the start of the operation of an internal combustion engine the inner pipe 22 also heats up relatively rapidly so that even very early on in such a cold start phase a substantially complete evaporation and mixing of the reactant R can already be ensured in the longitudinal region B.

The downstream end of the inner pipe 22 in the flow direction is located upstream, that is, with a spacing from the exhaust gas treatment unit 14 or from the SCR catalytic converter 16. Preferably, the inner pipe 22 already terminates upstream of the downstream end of the outer pipe 20 in the flow direction. Thus a spacing is present between the downstream end of the inner pipe 22 and the exhaust gas treatment unit 14 or the SCR catalytic converter 16, a flow section which ensures the mixing of the outer flow $S_A$ with the internal flow $S_I$ being formed therein. Thus it is also ensured that the part of the exhaust gas A which in principle contains no reactant R and which flows through the external volume 24 as external flow $S_A$, even before entering the SCR catalytic converter 16, can be mixed with the part of the exhaust gas A flowing through the internal volume 26 as the internal flow $S_I$ and mixed with reactant R. It is thus ensured that the exhaust gas and reactant flow through the SCR catalytic converter 16 substantially uniformly in its entire upstream cross section.

The division of the exhaust gas flow emitted from an internal combustion engine into the external flow $S_A$ and the internal flow $S_I$, ensures that an efficient mixing of exhaust gas and reactant occurs very rapidly in a cold start phase and thus a catalytic reaction in the exhaust gas treatment unit 14 can be set in motion. The time period during which substantially untreated exhaust gas is emitted to the surroundings can thus be significantly reduced. Since the mixing of exhaust gas A and reactant R in the internal volume 26 and also the evaporation of reactant are assisted due to the helically wound structure of the inner pipe 22, and the internal flow $S_I$ and the external flow $S_A$ are mixed by the swirl flow generated thereby at the downstream end of the inner pipe 22, a uniform use of the catalytic converter volume available in the exhaust gas treatment unit 14 is also ensured at the same time. The rapid and uniform mixing of exhaust gas A and reactant R also reduces the production of deposits, in particular urea deposits, which could impair the flowthrough of the exhaust gas guide component 12 over the operational service life.

It is understood that the foregoing description is that of the preferred embodiments of the invention and that various changes and modifications may be made thereto without departing from the spirit and scope of the invention as defined in the appended claims.

The invention claimed is:

1. An exhaust gas system for an internal combustion engine, the exhaust gas system comprising:
    an exhaust gas treatment unit;
    an exhaust gas guide for conducting exhaust gas to said exhaust gas treatment unit;
    a reactant discharge unit for discharging reactant into said exhaust gas guide;
    said exhaust gas guide including an outer pipe and an inner pipe arranged in a longitudinal region between said reactant discharge unit and said exhaust gas treatment unit;
    said outer pipe and said inner pipe conjointly defining an external volume wherethrough a first component of said exhaust gas can flow and said inner pipe defining an internal volume wherethrough a second component of said exhaust gas can flow;
    wherein the inner pipe has an inner pipe longitudinal axis and extends so as to be wound in a helical manner in the direction of said inner pipe longitudinal axis extending in a linear manner.

2. The exhaust gas system of claim 1, wherein said reactant discharge unit is arranged so as to cause the reactant discharged therefrom to be discharged into said exhaust gas guide and essentially only discharged into said internal volume.

3. The exhaust gas system of claim 1, wherein said outer pipe defines an outer pipe longitudinal axis and extends in a linear manner in said longitudinal region in the direction of said outer pipe longitudinal axis extending in a linear manner.

4. The exhaust gas system of claim 1, wherein said outer pipe is configured to be cylindrical in said longitudinal region.

5. The exhaust gas system of claim 1, wherein said inner pipe longitudinal axis extends in said internal volume in all of said longitudinal region.

6. The exhaust gas system of claim 1, wherein said inner pipe bears against said outer pipe along a connecting line wound in a helical manner about said inner pipe longitudinal axis.

7. The exhaust gas system of claim 6, wherein said inner pipe is connected to said outer pipe in the region of said connecting line.

8. The exhaust gas system of claim 1, wherein said outer pipe and said inner pipe have a same cross-sectional geometry to one another in said longitudinal region.

9. The exhaust gas system of claim 1, wherein said outer pipe and said inner pipe have a circular cross-sectional geometry in said longitudinal region.

10. The exhaust gas system of claim 1, wherein said inner pipe has a uniform cross-sectional geometry and/or a uniform cross-sectional size in said longitudinal region.

11. The exhaust gas system of claim 1, wherein said inner pipe terminates upstream of a downstream end of said outer pipe and/or upstream of said exhaust gas treatment unit.

12. The exhaust gas system of claim 1, wherein said exhaust gas treatment unit includes an SCR catalytic converter.

* * * * *